(12) United States Patent
Lee et al.

(10) Patent No.: US 11,870,186 B2
(45) Date of Patent: Jan. 9, 2024

(54) SURGE PROTECTOR WITH ACTIVE OVERLOAD PROTECTION

(71) Applicant: SCHNEIDER ELECTRIC IT CORPORATION, Foxboro, MA (US)

(72) Inventors: Hui-Ju Lee, Taipei (TW); Huang-Yun Chen, Taipei (TW)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/144,189

(22) Filed: Sep. 27, 2018

(65) Prior Publication Data

US 2020/0106221 A1   Apr. 2, 2020

(51) Int. Cl.
*H02H 3/08* (2006.01)
*H01R 13/713* (2006.01)
(Continued)

(52) U.S. Cl.
CPC ....... *H01R 13/713* (2013.01); *H01R 13/6616* (2013.01); *H01R 13/6683* (2013.01);
(Continued)

(58) Field of Classification Search
CPC .............. H01R 13/713; H01R 13/6616; H01R 13/6683; H01R 13/7175; H01R 25/003;
(Continued)

(56) References Cited

U.S. PATENT DOCUMENTS

| 5,844,326 A * | 12/1998 | Proctor | H02H 3/033 307/34 |
|---|---|---|---|
| 6,232,754 B1 | 5/2001 | Liebler et al. | |

(Continued)

FOREIGN PATENT DOCUMENTS

| CN | 2821983 Y | 9/2006 |
|---|---|---|
| CN | 101324821 A | 12/2008 |

(Continued)

OTHER PUBLICATIONS

Partial European Search Report from corresponding European Application No. 19199840.4 dated Feb. 25, 2020.
(Continued)

*Primary Examiner* — Alex Torres-Rivera
(74) *Attorney, Agent, or Firm* — Lando & Anastasi, LLP (57) ABSTRACT

Aspects of the present disclosure are directed to a power distribution device. The power distribution device includes an input to receive power, a plurality of outputs, each output of the plurality of outputs being configured to provide output power, and being coupled to the input, a plurality of switching devices, each switching device of the plurality of switching devices being coupled to a respective output of the plurality of outputs, and a controller coupled to each of the plurality of switching devices. The controller is configured to receive power information indicative of the output power provided by each output of the plurality of outputs, determine, based on the power information, that an overcurrent condition exists, select, based on the power information and based on the determination that the overcurrent condition exists, at least one of the plurality of switching devices to disable, and disable the at least one switching device.

13 Claims, 3 Drawing Sheets

(51) Int. Cl.
    *H01R 13/66* (2006.01)
    *H01R 13/717* (2006.01)
    *H01R 25/00* (2006.01)
    *H02H 3/033* (2006.01)
(52) U.S. Cl.
    CPC ....... *H01R 13/7175* (2013.01); *H01R 25/003* (2013.01); *H02H 3/033* (2013.01); *H02H 3/08* (2013.01)
(58) Field of Classification Search
    CPC .. H02J 3/14; H02H 3/08; H02H 3/033; G06F 1/28
    See application file for complete search history.

(56) References Cited

U.S. PATENT DOCUMENTS

| | | | | |
|---|---|---|---|---|
| 7,903,382 | B2* | 3/2011 | Premerlani et al. ... | H01H 83/20 361/13 |
| 9,047,071 | B2 | 6/2015 | Galsim et al. | |
| 9,263,877 | B1 | 2/2016 | Kellogg | |
| 2004/0148060 | A1* | 7/2004 | Lee ................... | H02J 3/14 700/295 |
| 2008/0019067 | A1 | 1/2008 | Reynolds et al. | |
| 2008/0309164 | A1* | 12/2008 | Lim ................... | H01R 13/7038 307/115 |
| 2010/0314949 | A1* | 12/2010 | DuBose et al. ......... | H02J 9/005 307/117 |
| 2016/0013646 | A1* | 1/2016 | Akerson ................ | H02J 3/14 307/39 |
| 2016/0195911 | A1* | 7/2016 | Chapel et al. ............ | G06F 1/28 713/340 |
| 2017/0279273 | A1* | 9/2017 | Tischer .................... | H02J 3/14 |
| 2018/0366885 | A1* | 12/2018 | Hewitt .................. | H01R 27/02 |
| 2019/0319545 | A1* | 10/2019 | Wang et al. .............. | G06F 1/28 |

FOREIGN PATENT DOCUMENTS

| | | |
|---|---|---|
| CN | 101326695 A | 12/2008 |
| CN | 106471694 A | 3/2017 |
| CN | 106597070 A | 4/2017 |

OTHER PUBLICATIONS

Extended European Search Report from corresponding European Application No. 19199840.4 dated Jun. 26, 2020.

* cited by examiner

SURGE PROTECTOR WITH ACTIVE OVERLOAD PROTECTION

BACKGROUND OF THE INVENTION

1. Field of the Invention

At least one example in accordance with the present invention relates generally to power distribution.

2. Discussion of Related Art

Power distribution devices, including Power Distribution Units (PDUs), outlets, and power strips, are known. Power distribution devices may include an input configured to receive input power, and at least one output to provide output power. For example, a power strip may include an input plug configured to be coupled to an input power source, and several outputs respectively configured to be coupled to a corresponding load. The power strip may receive power from the input power source at the input plug, and provide output power to each of the outputs.

SUMMARY

According to at least one aspect of the present invention, a power distribution device is provided comprising an input configured to receive input power, a plurality of outputs, each output of the plurality of outputs being configured to provide output power, and being coupled to the input, a plurality of switching devices, each switching device of the plurality of switching devices being coupled to a respective output of the plurality of outputs, and a controller coupled to each of the plurality of switching devices, the controller being configured to receive power information indicative of the output power provided by each output of the plurality of outputs determine, based on the power information, that an overcurrent condition exists, select, based on the power information and based on the determination that the overcurrent condition exists, at least one switching device of the plurality of switching devices to disable, and disable the at least one selected switching device.

In one embodiment, the controller is configured to select the at least one switching device of the plurality of switching devices to disable based on a change in load of an output coupled to the at least one switching device. In embodiments, the controller is configured to store a priority list of switching devices to disable, and wherein the controller is configured to select the at least one switching device to disable based on the priority list. In an embodiment, the device includes a plurality of shunt resistors, each coupled to a respective switching device of the plurality of switching devices.

In some embodiments, the device includes a sense circuit configured to be coupled to each shunt resistor of the plurality of shunt resistors. In one embodiment, the sense circuit is configured to measure a voltage across each shunt resistor of the plurality of shunt resistors, generate, based on the measured voltage across each shunt resistor, the power information, and transmit the power information to the controller. In embodiments, the at least one switching device is a relay. In at least one embodiment, disabling the switching device includes transmitting, by the controller, one or more control signals to the relay to actuate the relay to an open and non-conducting position.

In an embodiment, the device includes a circuit breaker coupled to the input. In embodiments, the controller is configured to disable the at least one switching device based on a current rating of the circuit breaker. In at least one embodiment, the device includes a plurality of Light-Emitting Diode (LED) indicators, each corresponding to an output of the plurality of outputs, wherein the controller is configured to illuminate at least one LED indicator of the plurality of LED indicators corresponding to the at least one switching device. In an embodiment, the method includes a piezoelectric buzzer, wherein the controller is configured to control the piezoelectric buzzer to produce a sound indicative of the at least one selected switching device being disabled.

According to one aspect, a method of operating a power distribution device is provided, the power distribution device having an input to receive input power, and a plurality of outputs each coupled to a respective switching device of a plurality of switching devices and configured to provide output power, the method including receiving power information indicative of the output power provided by each output of the plurality of outputs, determining, based on the power information, that an overcurrent condition exists, selecting, based on the power information and based on the determination that the overcurrent condition exists, at least one switching device of the plurality of switching devices to disable, and disabling the at least one selected switching device.

In one embodiment, selecting at least one switching device of the plurality of switching devices to disable includes selecting at least one switching device based on a change in load of an output coupled to the at least one switching device. In an embodiment, the method includes storing a priority list of switching devices to disable, and wherein selecting at least one switching device to disable includes selecting at least one lowest-priority switching device to disable from the priority list. In at least one embodiment, selecting at least one switching device of the plurality of switching devices to disable includes generating, based on the power information, a priority list of switching devices to disable, and selecting at least one lowest-priority switching device to disable from the priority list.

In at least one embodiment, generating the priority list of switching devices to disable includes determining, based on the power information, that at least one output of the plurality of outputs is drawing more current than the power distribution device is rated to provide, and assigning, responsive to determining that the at least one output is drawing more current than the power distribution device is rated to provide, a lowest priority to at least one switching device corresponding to the at least one output. In an embodiment, at least one output is coupled to a load, and generating the priority list of switching devices to disable includes determining, based on the power information, a criticality of a mode of operation of each load corresponding to a respective output of the at least one output, and assigning a lowest priority to a switching device corresponding to an output coupled to a load in a lowest-criticality mode of operation.

According to one aspect, a power distribution system is provided. The power distribution system includes an input configured to receive input power, a plurality of outputs, each output being configured to provide output power, and means for selecting, based on the output power, at least one output of the plurality of outputs to disable, and means for disabling the selected at least one output from providing the output power. In one embodiment, the system includes a sense circuit configured to determine power characteristic information indicative of the output power.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE INVENTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, power distribution devices are generally known. Power distribution devices may have applications in many environments, including residential and commercial environments. For example, power outlets including one or more outputs are commonplace in most residential and commercial structures. Power strips including one or more receptacles may be used in residential environments and office environments. PDUs including one or more receptacles are often implemented in data centers to distribute power to one or more racks, and to distribute power to components within a rack.

Power distribution devices may be subject to significant variations in output power demands depending on a number of connected loads and the connected loads' respective power demands. For example, consider a power strip having six outputs. At a first time, only one output of the six outputs may be connected to a load which draws a moderate current (for example, 2 Amperes [A]). At a second time, each of the six outputs may be connected to a respective load, each drawing a large amount of current (for example, 4 A each). In the foregoing example, the current demand at the second time is twelve times larger than the current demand at the first time. Accordingly, the power strip is subject to significant variations in a range of possible output current demand. Particularly high current draw within the range of possible output current demand may be considered an excessive current draw.

Excessive current draw during an overcurrent condition may cause an undesirable rise in temperature in the power strip. To mitigate or otherwise address the effects of overcurrent conditions, conventional power strips may include a circuit breaker coupled to the input and rated to withstand a specific amount of current. If the current through the circuit breaker exceeds the current rating of the circuit breaker, the circuit breaker will "trip," or open, thereby preventing current from passing through the circuit breaker and eliminating or mitigating the overcurrent condition. However, by eliminating input current to the power strip, power is no longer provided to any of the outputs.

In one embodiment of the present disclosure, power distribution devices configured to eliminate or mitigate an overcurrent condition are provided. For example, power distribution devices are provided which are configured to eliminate or mitigate an overcurrent condition without discontinuing power provision to all receptacles of the power distribution device. Responsive to detecting an overcurrent condition, some embodiments of the present disclosure are configured to disable power provision to a subset of the receptacles to address the overcurrent condition while enabling power provision to a complementary subset of the receptacles.

As used herein, excessive current in a power distribution device may be defined as a current in excess of a maximum permissible current value. In some embodiments, the maximum permissible current value may be a set value specified by a designer of the power distribution device. For example, the maximum permissible current value may be equal to or slightly less than a current rating of a circuit breaker. In alternate embodiments, the maximum permissible current value may be dynamically determined based on one or more parameters (for example, an ambient temperature parameter or a parameter indicative of the age of the power distribution device). In still other embodiments, the maximum permissible current value may be statically or dynamically determined according to alternate methods.

Figure 1:
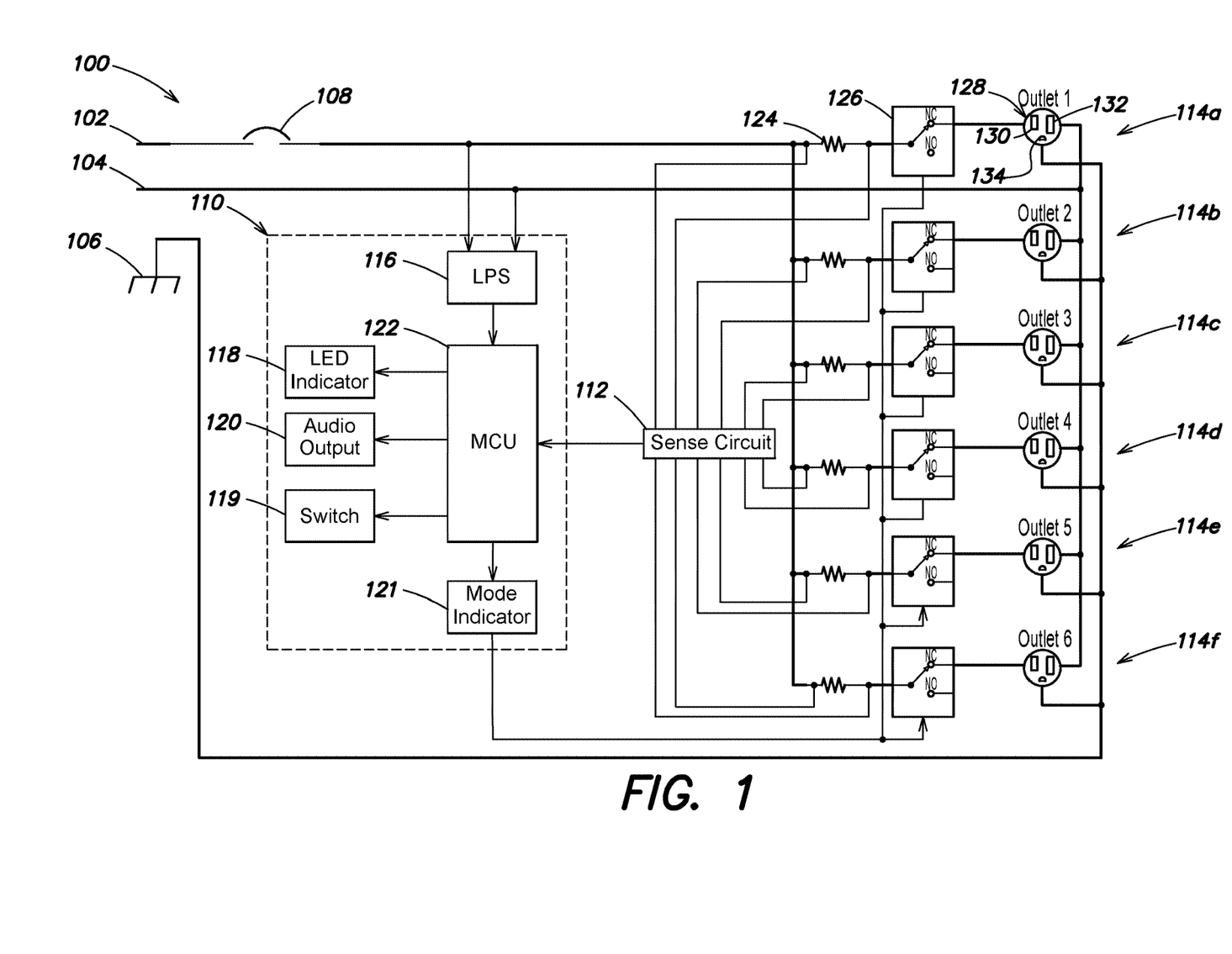
FIG. 1 illustrates a schematic diagram of a power distribution device according to an embodiment.

FIG. 1 illustrates a schematic diagram of a power distribution device 100 according to an embodiment. The power distribution device 100 includes a line input 102, a neutral input 104, a ground connection 106, a circuit breaker 108, a controller 110, a sense circuit 112, and a plurality of outputs 114a-114f. The controller 110 includes a Logic Power Supply (LPS) 116, a Light-Emitting Diode (LED) indicator 118, a switch 119, an audio output device 120, a mode indicator 121, and a Micro-Controller Unit (MCU) 122.

The output 114a includes a shunt resistor 124, a switching device 126, and an output connector 128. The output connector 128 includes a line output 130, a neutral input 132, and a ground connection 134. The outputs 114b-114f may be substantially similar to the output 114a in at least one embodiment. Accordingly, while the operation and configuration of the output 114a is specifically discussed in the following examples for purposes of explanation only, the outputs 114b-114f are operated and configured similarly.

The line input 102 is configured to receive input power (for example, input AC mains power) from an input power source (not illustrated), and is configured to be coupled to the circuit breaker 108. The neutral input 104 is configured to be coupled to the input power source, and is configured to be coupled to the LPS 116 and the neutral input 132. The ground connection 106 is configured to be coupled to a reference node operating at a reference voltage (for example, a ground voltage), and is configured to be coupled to the ground connection 134.

The circuit breaker 108 is configured to be coupled to the line input 102 at a first connection, and is configured to be coupled to the LPS 116 and the shunt resistor 124 at a second connection. The sense circuit 112 is configured to be coupled to the MCU 122, and is configured to be coupled across the shunt resistor 124. The LPS 116 is configured to be coupled to a bus connecting the circuit breaker 108 and the shunt resistor 124 at a first input, is configured to be coupled to a bus connecting the neutral input 104 and the neutral input 132 at a second input, and is configured to be coupled to the MCU 122 at an output.

The LED indicator 118 is configured to be coupled to the MCU 122. The switch 119 is configured to be coupled to the MCU 122. The audio output device 120 is configured to be coupled to the MCU 122. The mode indicator 121 is configured to be coupled to the MCU 122. The MCU 122 is configured to be coupled to the sense circuit 112, the LPS 116, the LED indicator 118, the switch 119, the audio output device 120, the mode indicator 121, and the switching device 126. The shunt resistor 124 is configured to be coupled to the circuit breaker 108, the sense circuit 112, and the LPS 116 at a first connection, and is configured to be coupled to the sense circuit 112 and the switching device 126 at a second connection. The switching device 126 is configured to be coupled to the shunt resistor 124, and is configured to be selectively (i.e., switchably) coupled to the line output 130. In one embodiment, the switching device 126 is a relay configured to be communicatively coupled to, and controlled by, the MCU 122.

The output connector 128 may be configured to be coupled to a plug configured to receive power to be provided to a load coupled to the plug. For example, the output connector 128 may be configured to be coupled to a plug having three pins (not illustrated). The line output 130 is configured to be coupled to the switching device 126, and may be configured to be coupled to a first pin of the three pins of the plug. The neutral input 132 is configured to be coupled to the neutral input 104, and may be configured to be coupled to a second pin of the three pins of the plug. The ground connection 134 is configured to be coupled to the ground connection 106, and may be configured to be coupled to a third pin of the three pins of the plug.

In one embodiment, the power distribution device 100 is generally configured to receive line power at the line input 102 from a power source and provide at least a portion of the line power to one or more of the outputs 114a-114f. In one example, power may be provided only to loads connected to outputs having a corresponding switching device in a closed (i.e., conducting) position. The MCU 122 may communicate one or more control signals to the switching devices to control a position of the switching devices.

For example, if the output 114a is coupled to a load via the output connector 128, power from the line input 102 will only be provided to the load if the switching device 126 is in a closed and conducting position. In some embodiments, a position of the switching device 126 is controlled by the MCU 122. Accordingly, the MCU 122 may selectively provide power to a subset of the outputs 114a-114f by selectively closing the switching devices corresponding to output connectors for which power is to be provided, and opening the switching devices corresponding to output connectors for which power is to not be provided. In some embodiments, "disabling a switching device" may include controlling the switching device to be in an open and non-conducting position.

Figure 2:
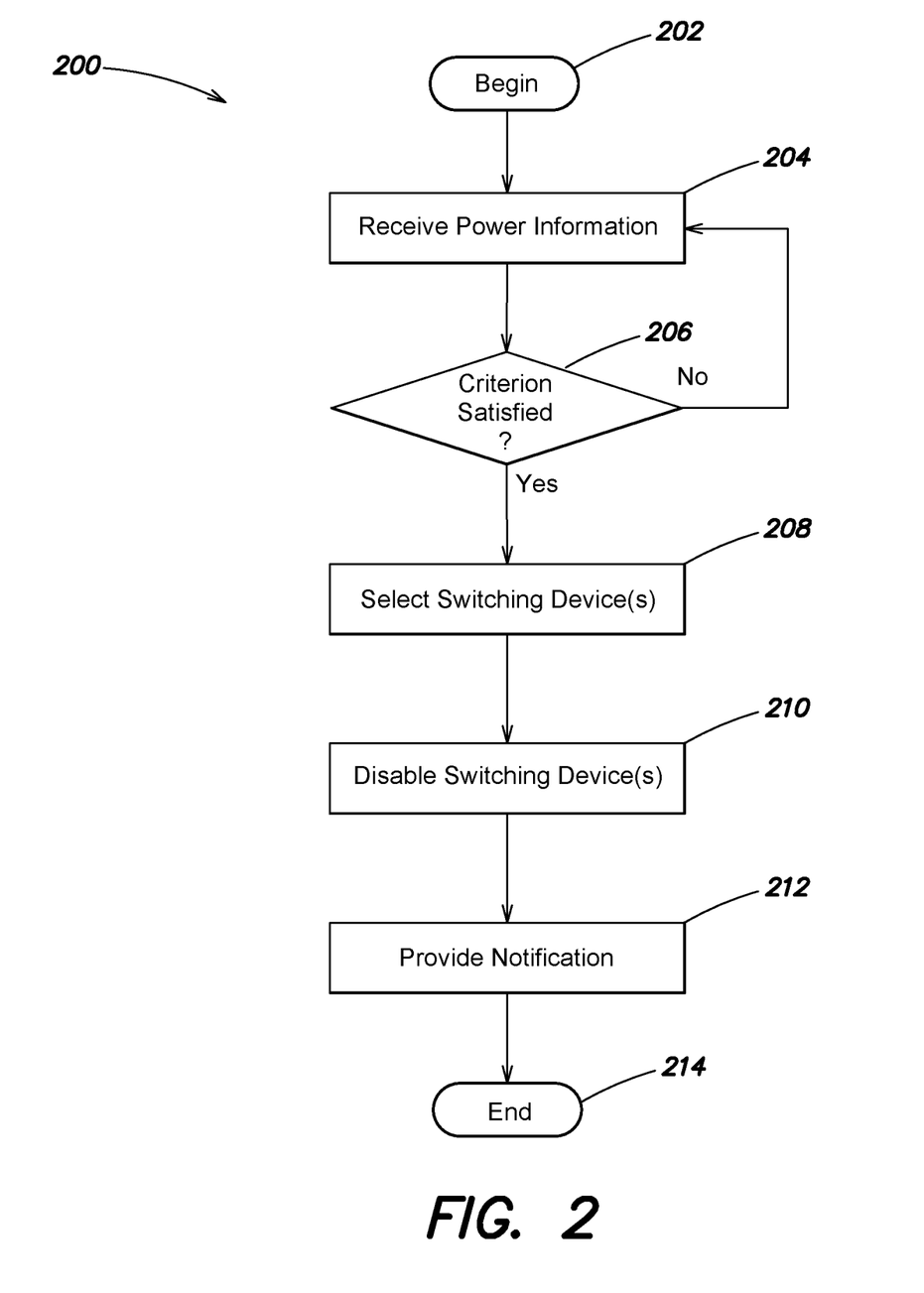
FIG. 2 illustrates a process of controlling one or more switching devices according to an embodiment.

A state of the switching devices corresponding to the outputs 114a-114f may be controlled by the MCU 122 in connection with information received from the sense circuit 112. FIG. 2 illustrates a process 200 for controlling a corresponding state of one or more switching devices. For example, the process 200 may be executed by the MCU 122. The process 200 includes acts of receiving power information, determining if a criterion is satisfied, selecting at least one switching device to disable, disabling the at least one switching device, and providing a notification of the disabling.

At act 202, the process 200 begins. At act 204, power information is received. For example, the MCU 122 may receive the power information from the sense circuit 112. The sense circuit 112 may determine the power information by measuring a voltage drop across the shunt resistors, including the shunt resistor 124, respectively coupled to each of the outputs 114a-114f. The power information may be information indicative of a total amount of power provided to the outputs 114a-114f, or may be information indicative of power provided to each of the outputs 114a-114f individually. The power information may be expressed in terms of power consumed, or may be expressed in terms of current, voltage, or a combination thereof. For example, the sense circuit 112 may measure a voltage across each shunt resistor of the outputs 114a-114f, and determine a corresponding current through each shunt resistor using the measured voltage where the value of the shunt resistor is known.

At act 206, a determination is made as to whether a criterion is satisfied. Generally speaking, satisfaction of the criterion may indicate that an overcurrent condition may be present. For example, determining whether the criterion is satisfied may include determining whether a total output current (i.e., the cumulative current provided by the outputs 114a-114f), which is substantially equivalent to the input current, exceeds a threshold value.

As discussed above, the threshold value may be a static value (for example, set by a designer of the power distribution device 100 based on a rating of the circuit breaker 108), or may be a dynamic value. For example, the MCU 122 may dynamically determine a threshold current value based on a temperature of or around the power distribution device 100, or based on a date of manufacture of the power distribution device 100. If the criterion is not satisfied (206 NO), which may indicate that a level of a current output by the power distribution device 100 is within a permissible range, then the process 200 returns to act 204.

Otherwise, if the criterion is satisfied (206 YES), then the process 200 continues to act 208. For example, determining that the criterion is satisfied may include determining that a total current through the power distribution device 100 is excessively high. At act 208, one or more switching devices are selected to be disabled to reduce a total output current. A process of selecting one or more switching devices to be disabled is discussed in greater detail below.

At act 210, one or more switching devices are disabled. For example, disabling one or more switching devices may include controlling, by the MCU 122, the one or more switching devices selected at act 208 to be in an open and non-conducting state, thereby substantially eliminating current passing through the selected switching device. At act 212, a notification indicative of the overcurrent condition is provided. For example, the power distribution device 100 may provide a notification to one or more users indicating that power provision to one or more of the outputs 114a-114f has been disabled. In one embodiment, the MCU 122 is configured to provide one or more signals to one or both of the LED indicator 118 and the audio output device 120, as discussed in greater detail below. At act 214, the process 200 ends.

Execution of the process 200 may enable a power distribution device having several outputs to continue providing power to at least a subset of the several outputs responsive to detecting an overcurrent condition. In one embodiment, one or more of the several outputs is selected and disabled from providing power to reduce the total output current to a permissible current level. For example, a permissible current level may be a current level at or below the maximum current rating of a circuit breaker, such as the circuit breaker 108. Accordingly, an overcurrent condition may be addressed without tripping the circuit breaker 108, and without disabling power provision to all of the outputs 114a-114f.

Selecting one or more switching devices to be disabled, as discussed above in connection with act 208 of the process 200, may be implemented according to one of several embodiments. In one embodiment, a switching device corresponding to a most-recently-connected load is selected. For example, if an overcurrent condition is detected responsive to a load being connected to the output 114a, then the switching device 126 may be selected to be disabled because it corresponds to a most-recently-connected load. Alternatively, a most-recently-connected load may more broadly include a load which most recently changed a power draw which caused an overcurrent condition. For example, if a load which was not most recently connected changes a mode of operation and suddenly draws more power, the load may be considered a most-recently-connected load regardless of whether the load was most recently physically connected to the power distribution device 100.

In another embodiment, a priority list of switching devices may be determined, and a lowest-priority switching device may be selected to be disabled. For example, a user may establish a static priority list indicating that the output 114a is a lowest-priority receptacle, the output 114b is a second-lowest-priority receptacle, and so forth. The priority list may be stored within the MCU 122 or in external memory or logic circuits coupled to the MCU 122. If an overcurrent condition is detected, regardless of which of the outputs 114a-114f was most recently connected to a load, the switching device 126 corresponding to the output 114a may be disabled first because the output 114a is the lowest-priority output. If the overcurrent condition persists, then the switching device corresponding to the output 114b may be disabled because it is a next-lowest-priority output, and so forth until the overcurrent condition is eliminated or reduced to a desired level.

In another embodiment, a dynamic determination may be made based on one or more electrical characteristics to select a switching device corresponding to one of the outlet receptacles 114a-114f to disable. The electrical characteristics may be received from the sense circuit 112 and may be indicative of current, voltage, or power provided to each respective load. For example, the dynamic determination may include determining, by the MCU 122, that a single load is drawing more current than the circuit breaker 108 is rated to withstand. Accordingly, the MCU 122 may determine that a switching device corresponding to the single load should be disabled because, even if the single load were operating in isolation, the circuit breaker 108 would be tripped.

In some embodiments, the MCU 122 may perform a dynamic determination based on a determined criticality of a mode of operation of a load corresponding to a respective switching device. Criticality of a load generally refers to a level of importance that a load receives power, where a high criticality load corresponds to a load for which power provision is very important, and a low criticality load corresponds to a load for which power provision is less important. For example, methods and systems for determining characteristics a mode of operation of a load connected to a power distribution device are discussed in U.S. Pat. No. 9,047,071, titled "METHOD AND APPARATUS FOR CONTROLLING DISTRIBUTION OF POWER," assigned to SCHNEIDER ELECTRIC IT CORPORATION of West Kingston, Rhode Island, which is hereby incorporated by reference in its entirety.

In some embodiments, the power distribution device 100 may be configured to select a switching device to disable according to two or more of the foregoing implementations. For example, the switch 119 may be configured to switch between a first switching device selection implementation (for example, by disabling a most-recently-connected switching device) and a second switching device selection implementation (for example, by disabling a switching device according to a dynamic determination). In alternate embodiments, the switch 119 may be configured to switch between any number of states. The switch 119 may be a hardware switch, a software switch, or a combination of both.

The mode indicator 121 may indicate a mode of operation which has been switched to. For example, the mode indicator 121 may include one or more LED indicators, whereby a first LED indicator may be illuminated to indicate that the power distribution device 100 is operating in a first mode of operation, and a second LED indicator may be illuminated to indicate that the power distribution device 100 is operating in a second mode of operation.

As discussed above with respect to act 212 of the process 200, providing a notification to users of the power distribution device 100 may be executed in connection with one or more LED indicators and one or more audio output devices, such as the LED indicator 118 and audio output device 120. Although a single LED indicator 118 and a single audio device 120 are illustrated, in alternate embodiments, the LED indicator 118 may include multiple LED indicators, and the audio output device 120 may include multiple audio output devices. For example, in some embodiments, each of the outputs 114a-114f may correspond to a respective LED indicator, such that a disabled output may be indicated by a corresponding LED indicator being illuminated. A disabled output may be indicated by a corresponding LED indicator being illuminated in a first color (for example, red), and an enabled output may be indicated by a corresponding LED indicator being illuminated in a second color (for example, green).

In an embodiment having a single LED indicator, the single LED indicator may be illuminated to indicate that at least one of the outputs 114a-114f has been disabled. In yet another embodiment, the single LED indicator may be selectively illuminated and de-illuminated, whereby a blinking pattern of the single LED may be indicative of which of the outputs 114a-114f are enabled, and which are disabled.

Providing the one or more signals to the audio output device 120 may include providing the one or more signals to a piezoelectric buzzer, a speaker, or both. For example, where the audio output device 120 includes a piezoelectric buzzer, providing the one or more signals to the audio output device 120 may include controlling the piezoelectric buzzer to output a buzzing sound indicative of power provision by one of the outputs 114a-114f being disabled. In another embodiment, where the audio output device 120 includes a speaker, providing the one or more signals to the audio output device 120 may include controlling the speaker to output a message describing the condition of the outputs 114a-114f. For example, the message may be a human- or machine-comprehensible message stating that power provision to the output 114a and the output 114c has been disabled.

Figure 3:
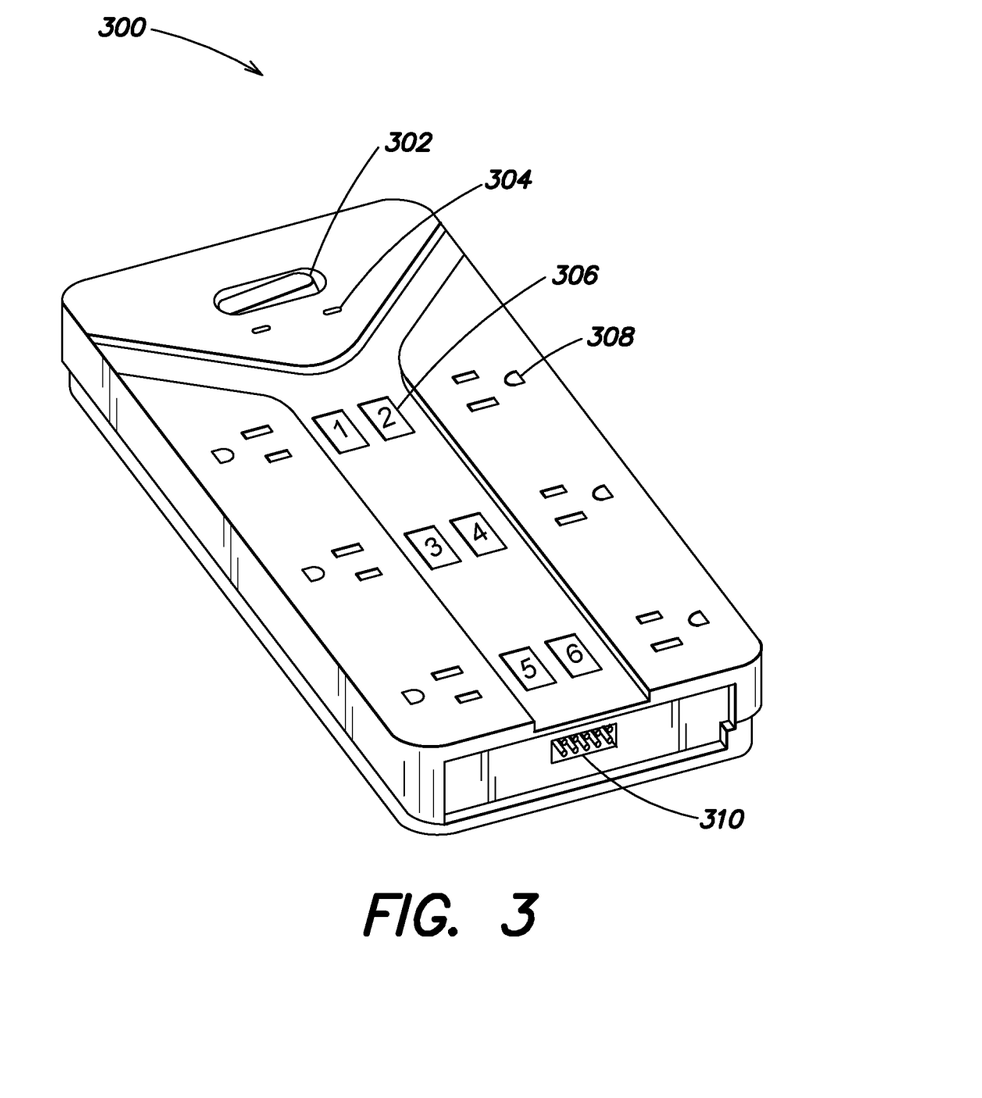
FIG. 3 illustrates a perspective view of a power distribution device according to an embodiment.

FIG. 3 illustrates a perspective view of a power distribution device 300 according to an embodiment. For example, the power distribution device 300 may be similar to the power distribution device 100, and may operate in a similar or same manner as the power distribution device 100. The power distribution device 300 includes a switch 302, a mode indicator 304, a plurality of LED indicators including a first LED indicator 306, a plurality of outputs including a first output 308, and a connection port 310.

The switch 302 is configured to switch between modes of operation of the power distribution device 300. For example, the switch 302 may enable the power distribution device to switch between a normal mode of operation in which power provision is disabled to a most-recently-connected output upon detection of an overload condition, and a smart mode of operation in which a priority list is provided to disable outputs in a hierarchical list when an overload condition occurs. Although the switch 302 is illustrated as a two-state rocker switch, in alternate embodiments the switch 302 may be any other type of switch, such as a hardware or software switch having any number of states.

The mode indicator 304 may indicate a mode of operation in which the power distribution device 300 is operating. For example, the mode indicator 304 may include a first LED indicator configured to be illuminated when the power distribution device 300 is in a normal mode of operation, and a second LED indicator configured to be illuminated when the power distribution device 300 is in a smart mode of operation. Each LED indicator of the plurality of LED indicators is configured to be associated with, and indicate the status of, an associated output of the plurality of outputs. For example, the first LED indicator 306 is configured to indicate a status (for example, providing power or not providing power) of the first output 308.

The connection port 310 is configured to enable a wired connection between the power distribution device 300 and an external entity, such as a computing device. For example, the external entity may include a personal computer, laptop computer, tablet computer, smartphone, and so forth. The wired connection to the connection port 310 may enable a user of the external entity to provide information to the power distribution device 300. For example, a user of the external entity may provide configuration information to the power distribution device 300. The configuration information may include, for example, a priority list indicating an order in which to disable outputs in the event of an overcurrent condition. In other embodiments, a wireless connection may be used to provide configuration data to the power distribution device 300.

Example embodiments of the present disclosure will now be described. In a first example, the outputs 114a, 114b, 114c, and 114d are each connected to a load drawing a current of 3.5 A. The power distribution device 100 is therefore providing a total current of 14 A. The circuit breaker 108 is rated to withstand a current of 15 A, and the MCU 122 is configured to disable a switching device corresponding to a most-recently-connected load responsive to a total current draw exceeding 15 A.

A load is subsequently connected to the output 114e, which draws a current of 16 A, yielding a total output current of 30 A from the power distribution device 100. The MCU 122 may receive electrical characteristic information from the sense circuit 112 indicating that the total current is 30 A, and determine that the total current provided by the power distribution device 100 exceeds 15 A. In response, the MCU 122 disables the switching device corresponding to the output 114e, thereby discontinuing current provision to the load connected to the output 114e. The total current output by the power distribution device 100 returns to 14 A, while power provision to the outputs 114a-114d continues uninterrupted.

The MCU 122 may be configured to address an overcurrent condition before the circuit breaker 108 is tripped. For example, in the foregoing example, the total current through the circuit breaker 108 is approximately 200% the rated current of the circuit breaker 108. The circuit breaker 108 may be rated to trip after approximately four seconds when the total current is approximately 200% the rated current. Accordingly, the MCU 122 may be configured to disable a switching device in less than four seconds such that the overcurrent condition is eliminated or mitigated before the circuit breaker 108 is activated.

In a second example, the outputs 114a, 114b, 114c, and 114d are each connected to a load drawing a current of 3.5 A. The power distribution device 100 is therefore providing a total current of 14 A. The circuit breaker 108 is rated to withstand a current of 15 A, and the MCU 122 is configured with a priority list of switching devices to disable responsive to detecting an overcurrent condition. More specifically, in the illustrated example, the MCU 122 is configured to disable, in order, the switching devices corresponding to the outputs 114a, 114b, 114c, 114d, 114e, and 114f, such that the switching device 126 corresponding to the output 114a is disabled first, and the switching device corresponding to the output 114f is disabled last.

A load drawing 5 A is subsequently connected to the output 114e, yielding a total output current of 19 A from the power distribution device 100. The MCU 122 may receive electrical characteristic information from the sense circuit 112 indicating that the total current is 19 A, and determine that the total current provided by the power distribution device 100 exceeds 15 A. In response, the MCU 122 disables the switching device corresponding to the first output in the priority list, specifically, the switching device 126 corresponding to the output 114a. The current provided by the output 114a is reduced from approximately 3.5 A to approximately 0 A, yielding a total output current of 15.5 A.

The MCU 122 may determine that the total current provided by the power distribution device 100 still exceeds 15 A. In response, the MCU 122 disables the switching device corresponding to the second output in the priority list, specifically, the switching device corresponding to the second output 114b. The current provided by the output 114b is reduced from approximately 3.5 A to approximately 0 A. The total current output by the power distribution device 100 drops to approximately 12 A, while power provision to the outputs 114c-114e continues uninterrupted. Similar to the first example discussed above, the MCU 122 addresses the overcurrent condition before the circuit breaker 108 is tripped.

In a third example, the outputs 114a, 114b, 114c, and 114d are each connected to a load drawing a current of 3.5 A. The power distribution device 100 is therefore providing a total current of 14 A. The circuit breaker 108 is rated to withstand a current of 15 A, and the MCU 122 is configured to execute a dynamic determination of a switching device to disable responsive to detecting an overcurrent condition. For example, the dynamic determination may be based on electrical characteristic information.

A load drawing 16 A is subsequently connected to the output 114e, yielding a total output current of 30 A from the power distribution device 100. The MCU 122 may receive electrical characteristic information from the sense circuit 112 indicating that the total current is 30 A, and determine that the total current provided by the power distribution device 100 exceeds 15 A. The MCU 122 may determine, based on the electrical characteristic information from the sense circuit 112 relating specifically to the output 114e, that the load connected to the output 114e draws more current than the circuit breaker 108 is rated to withstand. The MCU 122 may therefore select the switching device corresponding to the output 114e to disable, because the load connected to the output 114e alone draws more current than the circuit breaker 108 is rated to withstand. Therefore, the MCU 122 may disable the elected switching device responsive to determining that the power distribution device 100 cannot support the connected load.

As discussed above, the controller 110 may control certain aspects of the power distribution device 100. Using data stored in associated memory, the controller 110 also executes one or more instructions stored on one or more non-transitory computer-readable media that may result in manipulated data. In some examples, the controller 110 may include one or more processors or other types of controllers. In one example, the controller 110 performs a portion of the functions disclosed herein on a processor and performs another portion using an Application-Specific Integrated Circuit (ASIC) tailored to perform particular operations. As illustrated by these examples, examples in accordance with the present invention may perform the operations described herein using many specific combinations of hardware and software and the invention is not limited to any particular combination of hardware and software components.

In at least one embodiment, the MCU 122 may be powered by the LPS 116. For example, the LPS 116 may receive electrical power via the line input 102, condition the electrical power, and provide the conditioned power to the MCU 122. Conditioning the electrical power may include rectifying AC input power to DC power, and may further include stepping down the DC power to a lower voltage level.

Example embodiments provided herein are not intended to be limiting. For example, although the outputs 114a-114f of FIG. 1 are illustrated as being compatible with Type B plugs, in alternate embodiments, a power distribution device may have outputs configured to couple with one or more other types of plugs. Furthermore, although the power distribution device 100 is illustrated as having six outputs 114a-114f, in alternate embodiments, any type of power distribution device (including power strips, outlets, uninterruptible power supplies, and power distribution units) may be configured having any number of outputs. Similarly, although the power distribution device 300 is illustrated as having six outputs, any type of power distribution device may be configured having any number of outputs.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A power distribution device comprising:
   an input configured to receive input power;
   a plurality of outputs, each output of the plurality of outputs being configured to provide output power and being coupled to the input, the plurality of outputs including a first output and a second output;
   a plurality of switching devices, each switching device of the plurality of switching devices being coupled to a respective output of the plurality of outputs, the plurality of switching devices including a first switching device coupled to the first output and a second switching device coupled to the second output; and
   a controller coupled to each switching device of the plurality of switching devices, the controller being configured to:
      receive, at a first time, first power information indicative of the output power provided by each output of the plurality of outputs;
      determine based on the first power information that a first overcurrent condition exists;
      determine, based on a priority list responsive to determining that the first overcurrent condition exists, that the first output is a lowest-priority output and the second output is a higher-priority output;
      disable, responsive to determining that the first overcurrent condition exists and responsive to determining that the first output is the lowest-priority output, the first switching device based on the priority list;
      receive, at a second time, second power information indicative of the output power provided by each output of the plurality of outputs;
      determine based on the second power information that a second overcurrent condition exists; and
      disable, responsive to determining that the second overcurrent condition exists and responsive to determining that disabling the first switching device would not eliminate the second overcurrent condition, the second switching device to eliminate the second overcurrent condition based on a dynamic determination without disabling the first switching device.

2. The power distribution device of claim 1, wherein the controller is configured to determine that at least one of the first overcurrent condition or the second overcurrent condition exists based on a change in load of an output coupled to at least one switching device.

3. The power distribution device of claim 1, wherein the controller is configured to store the priority list of switching devices to disable, and wherein the controller is configured to select at least one switching device to disable based on the priority list.

4. The power distribution device of claim 1, wherein at least one of disabling the first switching device or the second switching device includes transmitting, by the controller, one or more control signals to a relay to actuate the relay to an open and non-conducting position.

5. The power distribution device of claim 1, further comprising a circuit breaker coupled to the input.

6. The power distribution device of claim 5, wherein the controller is configured to disable at least one switching device based on a current rating of the circuit breaker.

7. The power distribution device of claim 1, further comprising a plurality of light-emitting diode (LED) indicators, each corresponding to an output of the plurality of outputs, wherein the controller is configured to illuminate at least one LED indicator of the plurality of LED indicators corresponding to at least one disabled switching device.

8. The power distribution device of claim 1, further comprising a piezoelectric buzzer, wherein the controller is configured to control the piezoelectric buzzer to produce a sound indicative of at least one of the first switching device or the second switching device being disabled.

9. The power distribution device of claim 1, wherein disabling the second switching device to eliminate the second overcurrent condition based on the dynamic determination is based on a determined criticality of a mode of operation of a load coupled to the second output.

10. A method of operating a power distribution device having an input configured to receive input power, a plurality of outputs each coupled to a respective switching device of a plurality of switching devices and configured to provide output power to a plurality of loads, the plurality of switching devices including a first switching device and a second switching device, the plurality of outputs including a first output coupled to the first switching device and a second output coupled to the second switching device, the method including:
  receiving, at a first time, first power information indicative of the output power provided by each output of the plurality of outputs;
  determining, based on the first power information, that a first overcurrent condition exists;
  determining, based on a priority list responsive to determining that the first overcurrent condition exists, that the first output is a lowest-priority output and the second output is a higher-priority output;
  disabling, responsive to determining that the first overcurrent condition exists and responsive to determining that the first output is the lowest-priority output, the first switching device based on the priority list;
  receiving, at a second time, second power information indicative of the output power provided by each output of the plurality of outputs;
  determining based on the second power information that a second overcurrent condition exists; and
  disabling, responsive to determining that the second overcurrent condition exists and responsive to determining that disabling the first switching device would not eliminate the second overcurrent condition, the second switching device to eliminate the second overcurrent condition based on a dynamic determination without disabling the first switching device.

11. The method of claim 10, wherein determining that at least one of the first overcurrent condition or the second overcurrent condition exists is based on a change in load of an output coupled to at least one switching device.

12. A non-transitory computer-readable medium storing thereon sequences of computer-executable instructions for operating a power distribution device having an input configured to receive input power, a plurality of outputs each coupled to a respective switching device of a plurality of switching devices and configured to provide output power to a plurality of loads, the plurality of switching devices including a first switching device and a second switching device, the plurality of outputs including a first output coupled to the first switching device and a second output coupled to the second switching device, the sequences of computer-executable instructions including instructions that instruct at least one processor to:
  receive, at a first time, first power information indicative of the output power provided by each output of the plurality of outputs;
  determine, based on the first power information, that a first overcurrent condition exists;
  determine, based on a priority list responsive to determining that the first overcurrent condition exists, that the first output is a lowest-priority output and the second output is a higher-priority output;
  disable, responsive to determining that the first overcurrent condition exists and responsive to determining that the first output is the lowest-priority output, the first switching device based on the priority list;
  receive, at a second time, second power information indicative of the output power provided by each output of the plurality of outputs;
  determine based on the second power information that a second overcurrent condition exists; and
  disable, responsive to determining that the second overcurrent condition exists and responsive to determining that disabling the first switching device would not eliminate the second overcurrent condition, the second switching device to eliminate the second overcurrent condition based on a dynamic determination without disabling the first switching device.

13. The non-transitory computer-readable medium of claim 12, wherein the instructions further instruct the at least one processor to:
  determine, based on at least one of the first power information or the second power information, a criticality of a mode of operation of each load corresponding to a respective output of the plurality of outputs; and
  assign a lowest priority to a switching device corresponding to an output coupled to a load in a lowest-criticality mode of operation.

* * * * *